United States Patent
Olson

(10) Patent No.: US 9,650,208 B2
(45) Date of Patent: May 16, 2017

(54) SYSTEMS AND METHODS FOR ALLOCATING THE DEMAND IN A PRODUCT ORDER

(71) Applicant: TARGET BRANDS INC., Minneapolis, MN (US)

(72) Inventor: Melissa Olson, Maple Grove, MN (US)

(73) Assignee: Target Brands Inc., Minneapolis, MN (US)

( * ) Notice: Subject to any disclaimer, the term of this patent is extended or adjusted under 35 U.S.C. 154(b) by 270 days.

(21) Appl. No.: 14/311,757

(22) Filed: Jun. 23, 2014

(65) Prior Publication Data

US 2015/0368044 A1  Dec. 24, 2015

(51) Int. Cl.
G06F 7/00       (2006.01)
B65G 1/137     (2006.01)
G06Q 10/08    (2012.01)

(52) U.S. Cl.
CPC ......... B65G 1/1373 (2013.01); G06Q 10/087 (2013.01)

(58) Field of Classification Search
USPC ........................................................ 700/216
See application file for complete search history.

(56) References Cited

U.S. PATENT DOCUMENTS

| | | |
|---|---|---|
| 5,381,888 A | 1/1995 | Benson et al. |
| 7,469,219 B2 | 12/2008 | Goldberg |
| 7,603,299 B1 | 10/2009 | Dewey, Jr. et al. |
| 8,010,420 B2 | 8/2011 | Dewey, Jr. et al. |
| 8,244,603 B1 | 8/2012 | Tang et al. |
| 8,423,431 B1 | 4/2013 | Rouaix et al. |
| 8,442,879 B2 | 5/2013 | Dewey, Jr. et al. |
| 8,498,888 B1 | 7/2013 | Raff et al. |
| 8,527,373 B1 | 9/2013 | Ricci et al. |
| 8,538,578 B2 | 9/2013 | Battles et al. |
| 8,594,834 B1 | 11/2013 | Clark et al. |
| 8,626,333 B2 | 1/2014 | Waddington et al. |
| 2011/0106295 A1* | 5/2011 | Miranda .............. B65G 1/1378 700/216 |
| 2012/0030070 A1 | 2/2012 | Keller et al. |
| 2012/0072431 A1* | 3/2012 | Berlener ................ G06Q 30/06 707/748 |
| 2012/0173449 A1* | 7/2012 | Waddington ...... G06F 17/30902 705/338 |

OTHER PUBLICATIONS

Office Action from Canadian Patent Application No. 2,859,875, mailed Dec. 23, 2014 (4 pages).
Office Action from Canadian Patent Application No. 2,859,875, mailed Sep. 8, 2014 (4 pages).

* cited by examiner

Primary Examiner — Kyle Logan
(74) Attorney, Agent, or Firm — Hamre, Schumann, Mueller & Larson, P.C.

(57) ABSTRACT

Systems and methods for allocating the demand in an order for warehoused product so that the order is fulfilled by retrieving the ordered product from an automated warehouse and/or from a manual warehouse for shipment to a store. When an order for product is received, a control scheme determines whether the order will be fulfilled by the automated warehouse, by the manual warehouse, or by both.

22 Claims, 8 Drawing Sheets

SYSTEMS AND METHODS FOR ALLOCATING THE DEMAND IN A PRODUCT ORDER

BACKGROUND

Figure 1:
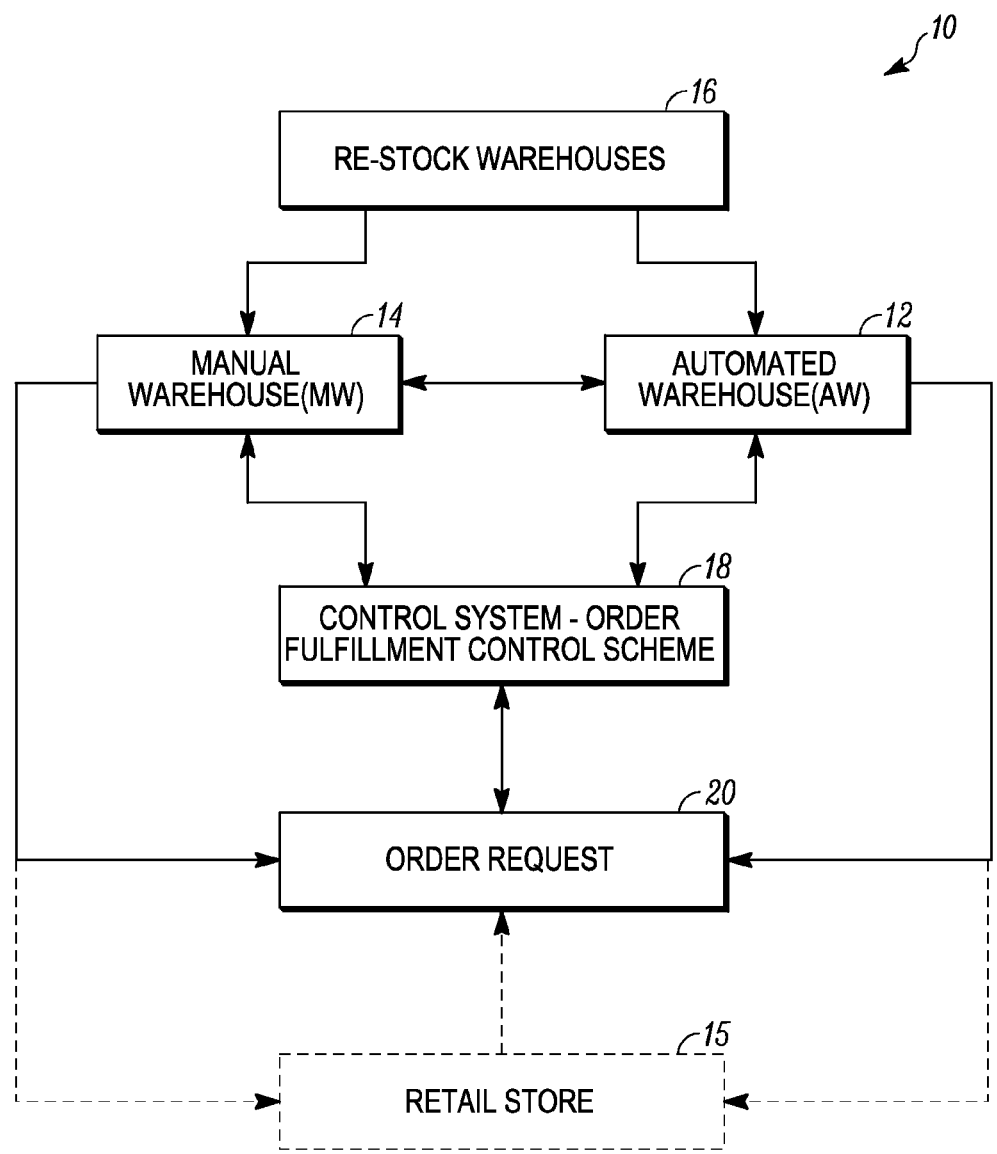

Many retail stores rely on the retrieval of product from warehouses to restock store shelves. Some product may be stored in an automated warehouse (AW) which is automated using robotics or the like where product to be shipped to a store is retrieved in an automated manner and ultimately loaded onto trucks or other transport for shipment to the store. Some product may also be stored in a manual warehouse (MW) where product to be shipped is manually retrieved and loaded onto trucks or other transport for shipment to the store. In some instances, the same product may be stored in both an AW and a MW.

SUMMARY

Systems and methods are described for allocating the demand in an order for warehoused product (also referred to as an order request or just an order) so that the order is fulfilled by retrieving the ordered product from an AW and/or a MW for shipment to a store. When an order for product is received, a control scheme determines whether the order will be fulfilled by retrieving and shipping the ordered product from the AW, the MW, or a combination of both. Determining how much of the order will be fulfilled by the AW and how much of the order will be fulfilled by the MW can be referred to as allocating the demand in the order or just allocating the order.

An AW is generally considered more efficient because it does not, or does not necessarily, require human interaction to retrieve the ordered product (although human interaction can be involved in shipping the ordered product from the AW, as one example). Therefore, in one embodiment (described below as Mode B), the control scheme can be configured to lean toward retrieving the ordered product from the AW over the MW to fulfill an order.

In many instances, the same product may be stored in both the AW and the MW. Therefore, the order can be allocated to result in retrieval and shipping of the ordered product from the AW, from the MW, or from a combination of both. The AW and the MW may be physically located at different locations from one another, or they could be physically located together, for example in a common building, but operationally separated from one another.

A control scheme described herein manages how the order is allocated to result in retrieval of the ordered product from the AW and/or the MW. In one embodiment, the order is allocated so as to result in retrieval and shipment of the ordered product from both the AW and the MW. However, in general, retrieving and shipping the ordered product from the AW is generally considered more efficient than from the MW. So in one embodiment, the control scheme can be weighted to lean toward allocating the order so that as much of the ordered product as possible is retrieved and shipped from the AW.

In an embodiment, the control scheme can track how full the AW is with product. If the AW contains more than a predetermined percentage of the ordered product, the control scheme can be configured to allocate the order to cause retrieval and shipment of the ordered product from the AW in order to make room for new product to be stored in the AW.

In another embodiment, the control scheme can determine whether or not the ordered product is even eligible for the AW. For example, certain products, such as fragile products, may not be ideally suited for placement in or automated retrieval from an AW. If an ordered product is not eligible for the AW, the control scheme is configured to allocate the order in a manner so that any available inventory of the ordered product that happens to be contained in the AW is retrieved for shipment, with the remainder of the ordered product being retrieved and shipped from the MW. By retrieving the ordered product that is not AW eligible from the AW, that product is removed as quickly as possible from the AW where it does not belong.

In another embodiment, a user can configure the control scheme so that the entire order (or a certain percentage thereof) is allocated to result in retrieval and shipment of the ordered product from the AW or from the MW.

In still another embodiment, the control scheme can be configured to allocate the order based on full pallet availability. In other words, when possible, it is preferable to retrieve and ship a full pallet of the ordered product from the MW to fulfill some or all of the order compared to having to retrieve and ship a partial pallet from the MW or having to manually remove product from a pallet to fulfill the order followed by reinduction of the removed product back into the AW.

DRAWINGS

FIG. 1 schematically depicts a system described herein for allocating the demand in a product order request to result in retrieval of warehoused product.

FIGS. 2A-F illustrate specifics of an embodiment of a control scheme for determining how the product order should be allocated.

Figure 3:
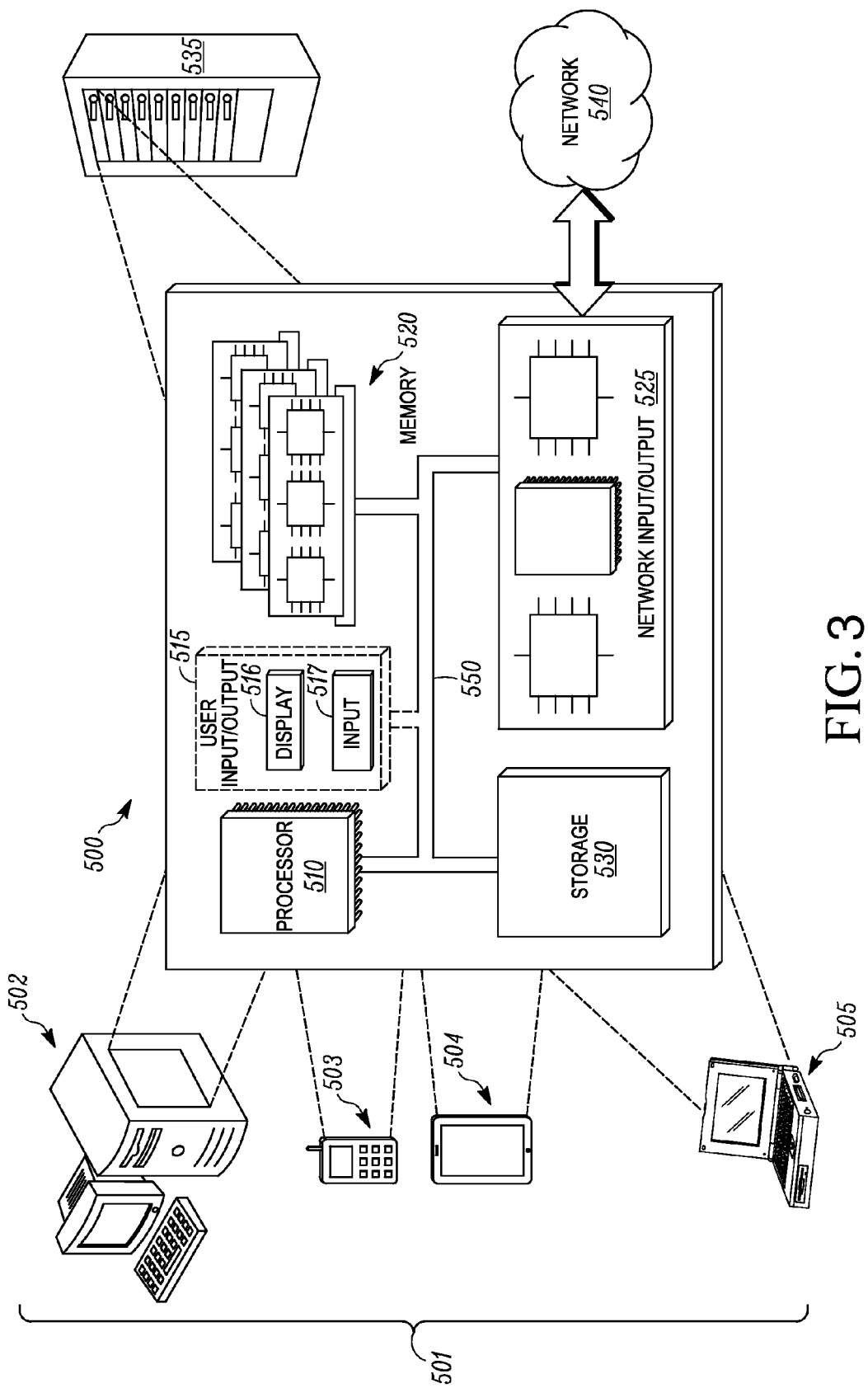

FIG. 3 is a schematic diagram of architecture of a computing device and computing system optionally used in connection with computer-implemented methods described in this document.

Like reference numbers represent like elements throughout.

DETAILED DESCRIPTION

Systems and methods are described for allocating the demand in an order request (or just order) for warehoused product so that the order is fulfilled by retrieving the ordered product from an AW and/or a MW and shipping the ordered product to a store requiring the ordered product. Allocating the demand will hereinafter be referred to as allocating the order or the like. When an order for product is received, a control scheme determines how the order will be allocated so that the ordered product will be retrieved from the AW, the MW, or a combination of both for shipment to the store.

As used herein, the term allocate refers to how the demand in an order will be divided up or assigned to the AW and/or the MW so that the requested quantity of the ordered product contained in the order will be retrieved from the AW and/or the MW to fully satisfy the order. In one embodiment, the order can be allocated entirely to the AW so that all of the ordered product is retrieved from the AW. In another embodiment, the order can be allocated entirely to the MW so that all of the ordered product is retrieved from the MW. In another embodiment, the order can be allocated to both the AW and the MW, so that some percentage of the quantity of the ordered product is retrieved from the AW while the remaining percentage of the quantity of the ordered product is retrieved from the MW. Ordered product that is retrieved from the AW and/or the MW is then shipped to the store.

As used herein, fulfilling a product order includes retrieving ordered product from the AW and/or the MW, and shipping the retrieved ordered product to the desired location such as the store in need of the ordered product.

As used herein, an AW is a product warehouse that is automated using primarily robotics or the like where all or some of the tasks related to storing, retrieving, and moving inventory are carried out by automated systems. Product to be shipped to a store in response to an order request is retrieved from within the AW in an automated manner with minimal or no human interaction in the product retrieval process, routed to a shipping section of the AW and then loaded onto trucks or other transport for shipment to the store. In an AW, product is stored in individual cartons or units instead of being arranged with other identical cartons or units on pallets. Therefore, in an AW, product can be retrieved on an individual carton or unit basis. As used herein, a carton can contain a single item or multiple items.

As used herein, a MW is a traditional product warehouse where product to be transported to a store in response to an order request is manually retrieved from within the MW and manually loaded onto trucks or other transport for shipment to the store. In a MW, product is stored packed together with other identical cartons or units on pallets. If the number of cartons on a pallet exceeds the number of cartons in an order, the pallet must be retrieved and the pack manually broken apart to remove a number of the cartons, with the removed cartons then being manually reinducted or reintroduced back into storage. Reinduction of removed cartons preferably occurs in the AW so that going forward those individual cartons can be more efficiently retrieved from the AW.

With reference initially to FIG. 1, a system 10 for allocating an order for product that is stored in one or more warehouses is illustrated. In the illustrated example, the system includes at least one AW 12 of a type well known in the art. The AW 12 warehouses product that can be retrieved therefrom for shipment to a store 15, such as a retail store, in response to an order request. Although a single AW 12 is illustrated, the systems and methods described herein can be implemented using two or more AWs 12. The system 10 also includes at least one MW 14 of a type well known in the art. The MW 14 also warehouses product that can be retrieved therefrom for shipment to the store 15 in response to an order request. Although a single MW 14 is illustrated, the systems and methods described herein can be implemented using two or more MWs 14.

In the AW 12, product is typically stored in individual cartons or units that are retrievable individually instead of being arranged with other identical cartons on pallets where the pallet is retrieved as in the MW 14. Therefore, in the AW 12, product can be retrieved carton-by-carton in numbers much smaller than in the MW 14.

In the MW 14, product is typically stored packed together with other identical cartons on pallets where retrieval of a pallet results in retrieval of a plurality of cartons.

For example, using toothbrushes as an example, the toothbrushes can be stored ten to a carton. In the AW 12, the cartons are stored individually and the cartons can be retrieved individually. By retrieving one carton from the AW 12, ten toothbrushes are retrieved. In contrast, in the MW 14, a full pallet may contain a plurality of the cartons, for example up to fifty of the cartons, with each carton containing the ten toothbrushes. Retrieval of a pallet in the MW 14 retrieves multiple cartons at once.

Although the AW 12 and the MW 14 are described as storing product in individual cartons, and cartons are retrieved, other embodiments are possible. In some embodiments, product can be stored individually rather than with other identical products in cartons. In some embodiments, product can be stored in cartons in either the AW 12 or the MW 14, but stored individually in the other warehouse. So as used herein, "retrieval of product", "retrieving product" or the like is intended to encompass retrieving individual ones of ordered product, as well as retrieving cartons or other containers that contain multiple ones of the ordered product.

To retrieve product from the MW 14, it is preferred that the control scheme described herein be set-up to allocate an order for fulfillment when possible by causing retrieval of an entire pallet of product without having to break apart the palleted product to remove excess product. That is, if the number of cartons on a pallet exceeds the number of cartons in an order, the pallet must be retrieved and the pack manually broken down to remove a number of the cartons, with the removed cartons then being manually reinducted or reintroduced back into storage. Reinduction of removed cartons preferably occurs in the AW 12 so that going forward those individual cartons can be more efficiently retrieved from the AW 12.

As the AW 12 and the MW 14 are depleted of product, the AW 12 and the MW 14 can be replenished or restocked from conventional supply means 16, for example as described in U.S. Pat. Nos. 7,603,299; 8,010,420; and 8,442,879, each of which is incorporated by reference in its entirety.

As depicted in FIG. 1, a control system 18 is in communication with each of the AW 12 and the MW 14. As discussed in further detail below, the control system 18 includes an order fulfillment control scheme that controls how orders are allocated so as to be fulfilled from the AW 12 and/or the MW 14.

The control system 18 can reside on one or more computers that are physically separated from, but in communication with, each of the AW 12 and the MW 14. The control system 18 and the AW 12 and the MW 14 can communicate with each other in any suitable, conventional manner including wired or wireless communication technology, for example via a private local area network or a private wide area network operated by the store 15, or via the Internet.

In another embodiment, the control system 18 can reside on one or more computers that are physically located at each of the AW 12 and the MW 14 so that users at the AW 12 and the MW 14 can interact with and control the control system 18.

An order request is transmitted from a remote computer 20 to the control system 18 to initiate an order. The remote computer 20 can be located within or be associated with the store 15, or the computer 20 can be physically located at a location separate from the store 15, for example at a headquarters location. The computer 20 and the control system 18 can communicate with each other in any suitable, conventional manner including wired or wireless communication technology, for example via a private local area network or a private wide area network operated by the store 15, or via the Internet. Any communication scheme can be used as long as the order request can be transmitted to and received by the control system 18.

The store 15 can be any store requiring supply of products from one or more warehouses. For example, the store 15 can be a retail store. In the case where the computer 20 and the store 15 are located together, ordered product that has been retrieved from the AW 12 and/or the MW 14 is shipped from one or both of the AW 12 and the MW 14, as determined by the control scheme, to the store 15. In the case where the computer 20 and the store 15 are separate from one another, the order request originates from the computer 20 but the ordered product is retrieved and shipped from one or both of the AW 12 and the MW 14, as determined by the control scheme, to the store 15 as indicated by the dashed lines in FIG. 1.

The order fulfillment control scheme 30 which is part of the control system 18 will be described with reference to FIGS. 2A-F. The control scheme 30 is configured to determine allocation of an order to determine whether the order will be fulfilled by retrieving and shipping the ordered product from the AW 12, from the MW 14, or from both. Retrieving product from the AW 12 is generally considered more efficient because it may not require human interaction in the product retrieval process, and in one embodiment discussed below (described as Mode B) the control scheme 30 is configured to lean toward allocating the order to the AW 12 over the MW 14.

Figure 2A:
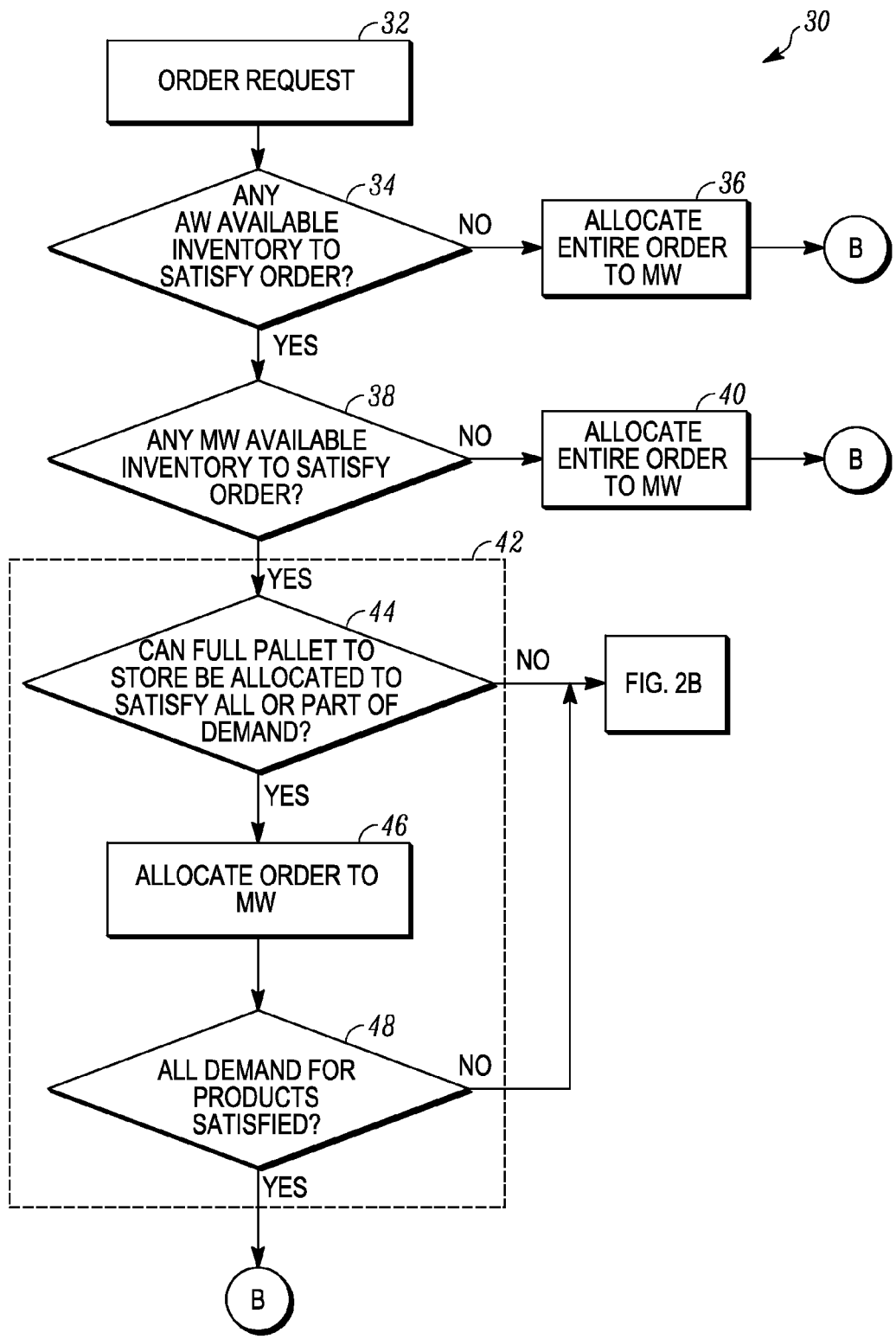

With reference initially to FIG. 2A, the control scheme 30 starts by receiving one or more order requests 32 for the store 15. The order request 32 includes a desired quantity of one or more ordered products that are needed by the store 15, as well as some suitable indicator that indicates where the ordered product should be shipped to, when the ordered product is needed, and the like.

The control scheme 30 then determines at decision point 34 whether there is any product inventory available in the AW 12 to satisfy the order 32. If no, the scheme proceeds to block 36 which allocates the entire order 32 to the MW 14 in which case the entire order 32 would be fulfilled from the MW 14, and then proceeds to point B in the control scheme discussed below in FIG. 2F. If the answer at decision point 34 is yes, the scheme 30 proceeds to decision point 38 which then determines whether there is any product inventory available in the MW 14 to satisfy the order 32.

If the decision at decision point 38 is no, the scheme proceeds to block 40 which allocates the entire order 32 to the AW 12 in which case the entire order 32 would be fulfilled from the AW 12, and then proceeds to point B in the control scheme discussed below in FIG. 2F. In order to make the determinations at decision points 34, 38, the control system 18 receives updates regarding the product inventory available in the AW 12 and the MW 14.

If the answer at decision point 38 is yes, the control scheme 30 proceeds to execute a full pallet availability routine 42. The purpose of the full pallet availability routine 42 is to cause retrieval of a full pallet(s) of ordered product if possible from the MW 14 to satisfy at least some of the order 32. Retrieving a full pallet of ordered product from the MW 14 is preferred since it is more efficient and avoids having to remove ordered product from a pallet prior to shipping to the store 15 which requires not only manual removal of product from the pallet but also reinduction (i.e. reintroduction or restocking) of the removed product back into storage, for example reinduction into the AW 12, which is inefficient. Reinducting removed product into the AW 12, rather than back into the MW 14, reduces the occurrence of partial pallets and individual cartons accumulating in the MW 14, and the individual cartons are more efficiently retrieved from the AW 12 using the existing automation tools than from the MW 14.

In the full pallet availability routine 42, at decision point 44 it is determined whether there is one or more full pallets of ordered product in inventory of the MW 14 that can be retrieved to satisfy all or part of the order 32. If the decision at decision point 44 is no, the routine 42 ends and the control scheme 30 proceeds to FIG. 2B.

If the decision at decision point 44 is yes, the routine 42 proceeds to block 46 where the control scheme 30 allocates some or all of the order 32 to the MW 14 to pull the full pallet(s) of ordered product. The routine 42 then proceeds to decision point 48 where it is determined whether the entire demand in the order 32 has been satisfied. If no, the routine 42 ends and the scheme proceeds to FIG. 2B. If yes, the routine 42 ends and the control scheme 30 proceeds to point B.

Figure 2B:
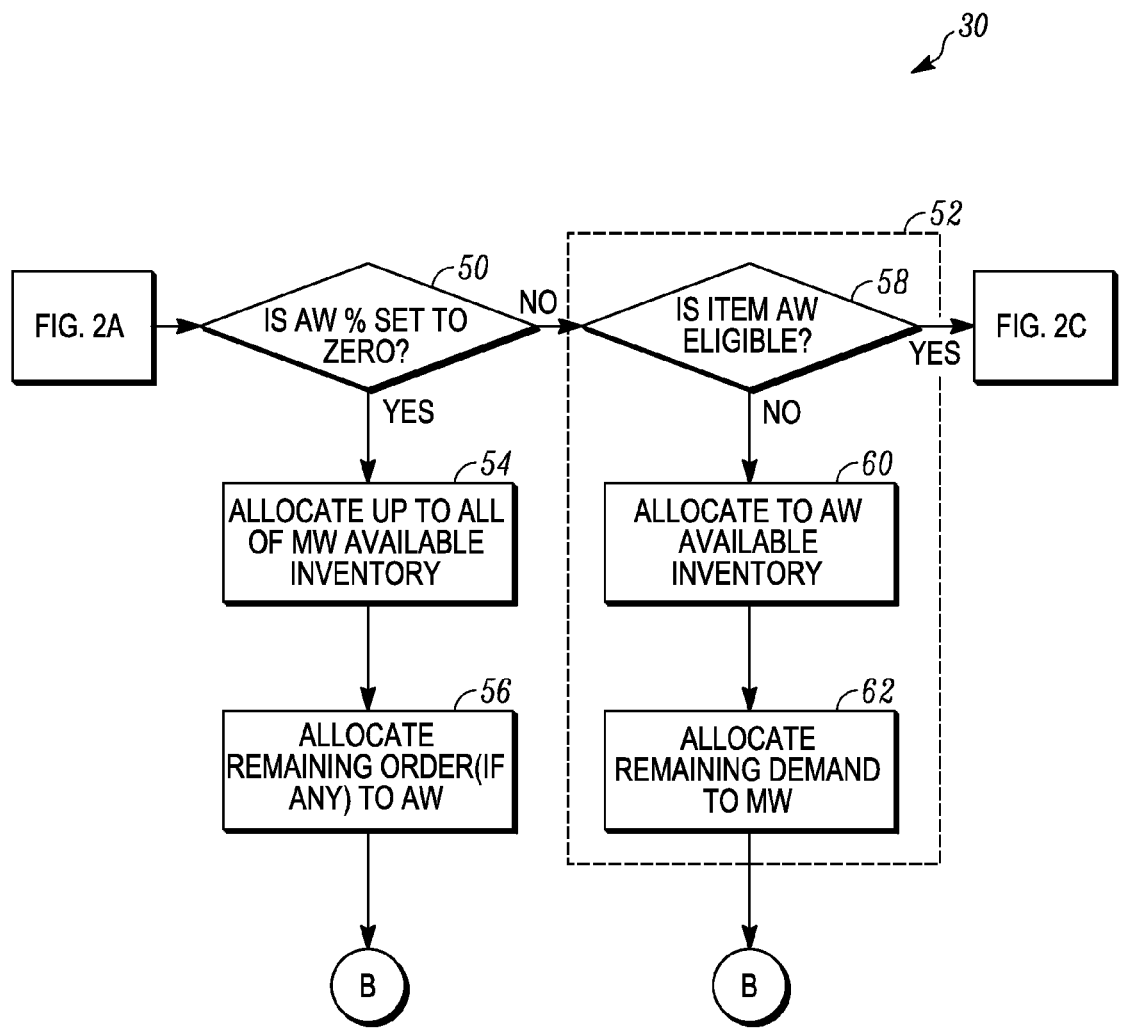

Turning to FIG. 2B, if either of the decisions at decision points 44 or 48 is no, the control scheme 30 proceeds to determine at decision point 50 whether a user settable percentage that controls the percentage of the order 32 that will be allocated to the AW 12 is set to zero. The user is able to set the percentage at zero to avoid retrieving any product from the AW 12 which can be useful in certain situations, for example when there is a failure at the AW 12 that would prevent retrieval of product from the AW 12.

If the decision at the decision point 50 is no, the control scheme 30 proceeds to an AW eligibility determination routine 52. If the decision at the decision point 50 is yes, the control scheme 30 proceeds to block 54 where the order 32 is allocated to the MW 14 available inventory, and then proceeds to block 56 which allocates any remaining product (if any) from the order 32 that is not available from the MW 14 to be fulfilled from the AW 12. The control scheme 30 then proceeds to point B.

The AW eligibility determination routine 52 in FIG. 2B is configured to determine whether or not product in the order 32 is even eligible for the AW 12. Certain products, such as fragile products or the like, may not be suited for automated retrieval in an AW environment. If an ordered product is not eligible for the AW 12, it is desirable to remove from the AW 12 any of that ordered product that happens to be located in the AW 12. So the routine 52 determines whether or not product is even eligible for the AW 12. If the routine 52 determines that the ordered product is not eligible, the control scheme 30 nonetheless is configured to allocate at least some of the order 32 to the AW 12 available inventory (if any) in order to remove the ordered product from the AW 12 where it does not belong.

As shown in FIG. 2B, the eligibility routine 52 includes a decision point 58 where it is determined whether or not a product is eligible for the AW 12. In making this decision, the control scheme 30 can refer to a user generated, and user modifiable, list of products that are not suited for the AW 12. If yes, the routine 52 ends and the control scheme proceeds to FIG. 2C. If no, the routine 52 proceeds to block 60 where the order 32 is allocated to the available inventory of the ordered product (if any) that happens to be present in the AW 12 so that the ineligible ordered product is removed from the AW 12, followed by block 62 where the remainder of the order 32 is allocated to the MW 14. After the block 62, the routine 52 ends and the control scheme 30 proceeds to point B.

Figure 2C:
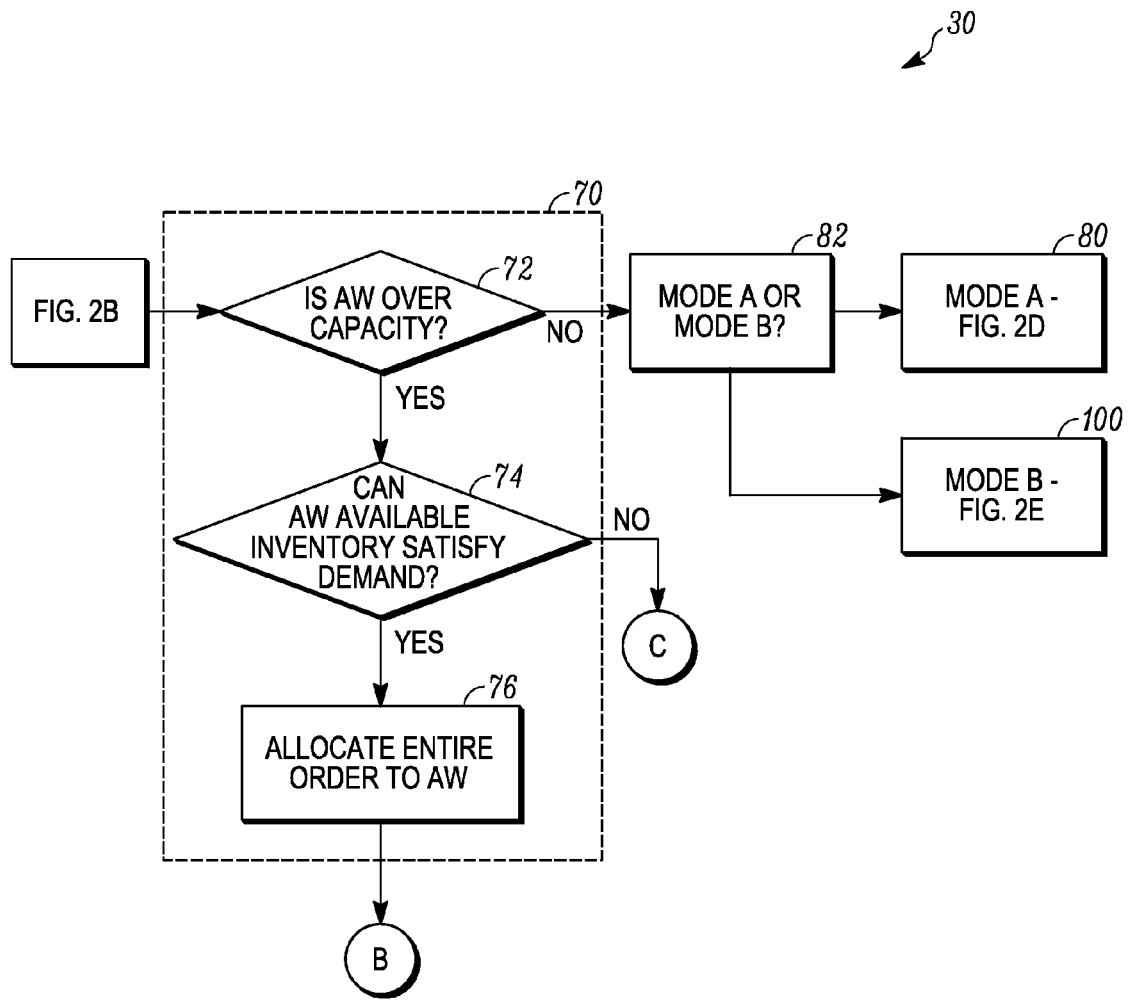

Referring to FIG. 2C, if the product is eligible for the AW 12, the control scheme 30 proceeds to execute a capacity reduction routine 70 that is configured to help reduce the amount of ordered product in the AW 12 by causing the order 32 to be allocated to the AW 12. The routine 70 monitors how full the AW 12 is with ordered product that is contained in the order 32, and if the AW 12 contains more than a predetermined percentage of the ordered product, the routine 70 will allocate the order 32 to the AW 12. This helps to reduce overcrowding in the AW 12 and permits more product to be added to the AW 12 which is typically more efficient to retrieve orders from than the MW 14 due to the automation in the AW 12.

The routine 70 includes a decision point 72 where it is determined whether or not the AW 12 is over capacity with respect to the ordered product. The capacity limit can be user settable, or fixed in the control scheme 30, to permit adjustment of the capacity level above which it is determined that the AW 12 is over capacity. If the AW 12 is not over capacity, the routine 70 ends and the control scheme 30 proceeds to Mode A discussed further below. If the AW 12 is at or over capacity, the routine 70 proceeds to decision point 74 where it is determined whether or not the entire order 32 can be satisfied from the available AW inventory. If no, the routine 70 ends and the control scheme 30 proceeds to point C. If the decision at the decision point 74 is yes, the routine 70 proceeds to block 76 where the entire order 32 is allocated to the AW 12 to retrieve the entire order 32 from the AW 12. After the block 76, the routine 70 ends and the control scheme 30 proceeds to point B.

Figure 2D:
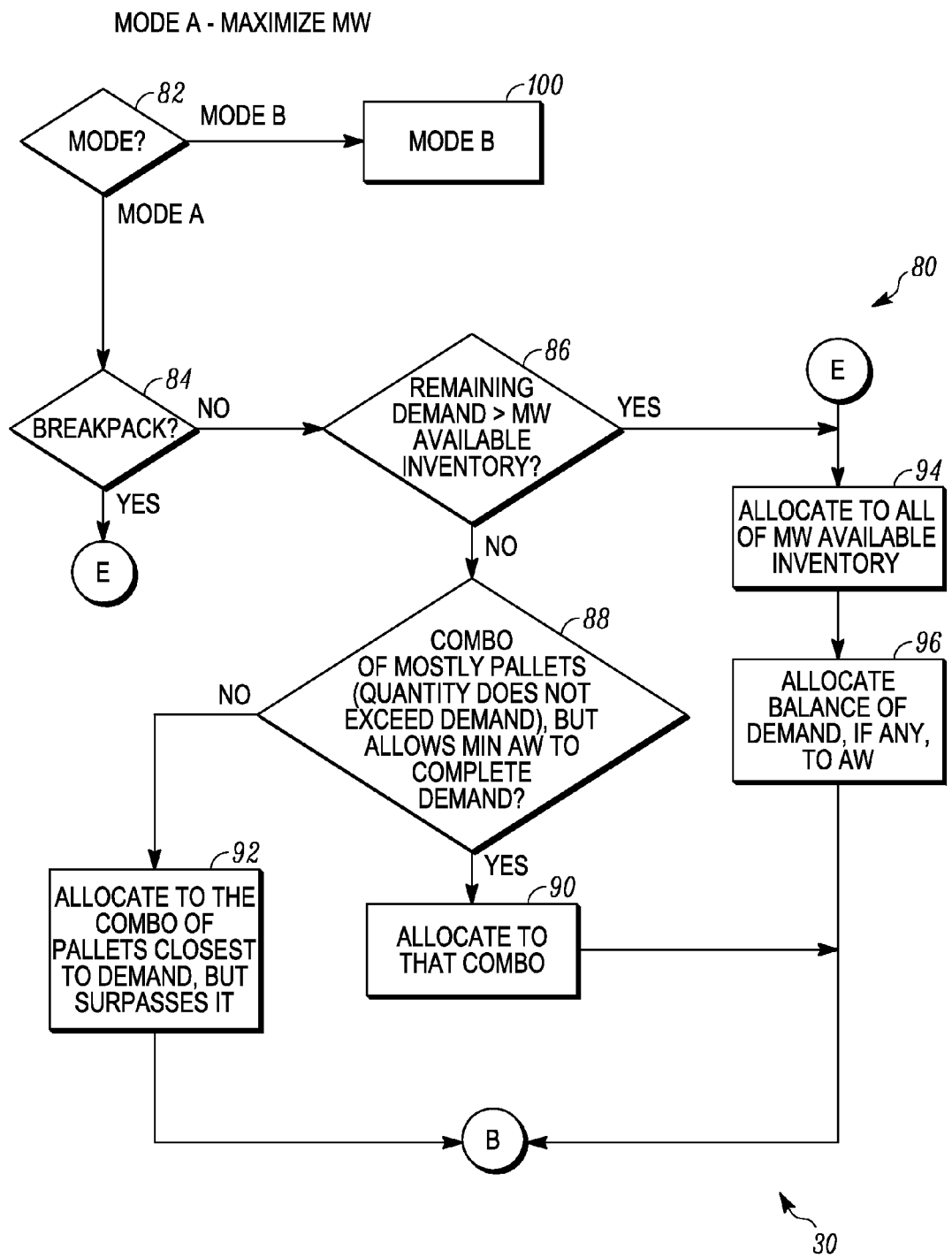
Figure 2E:
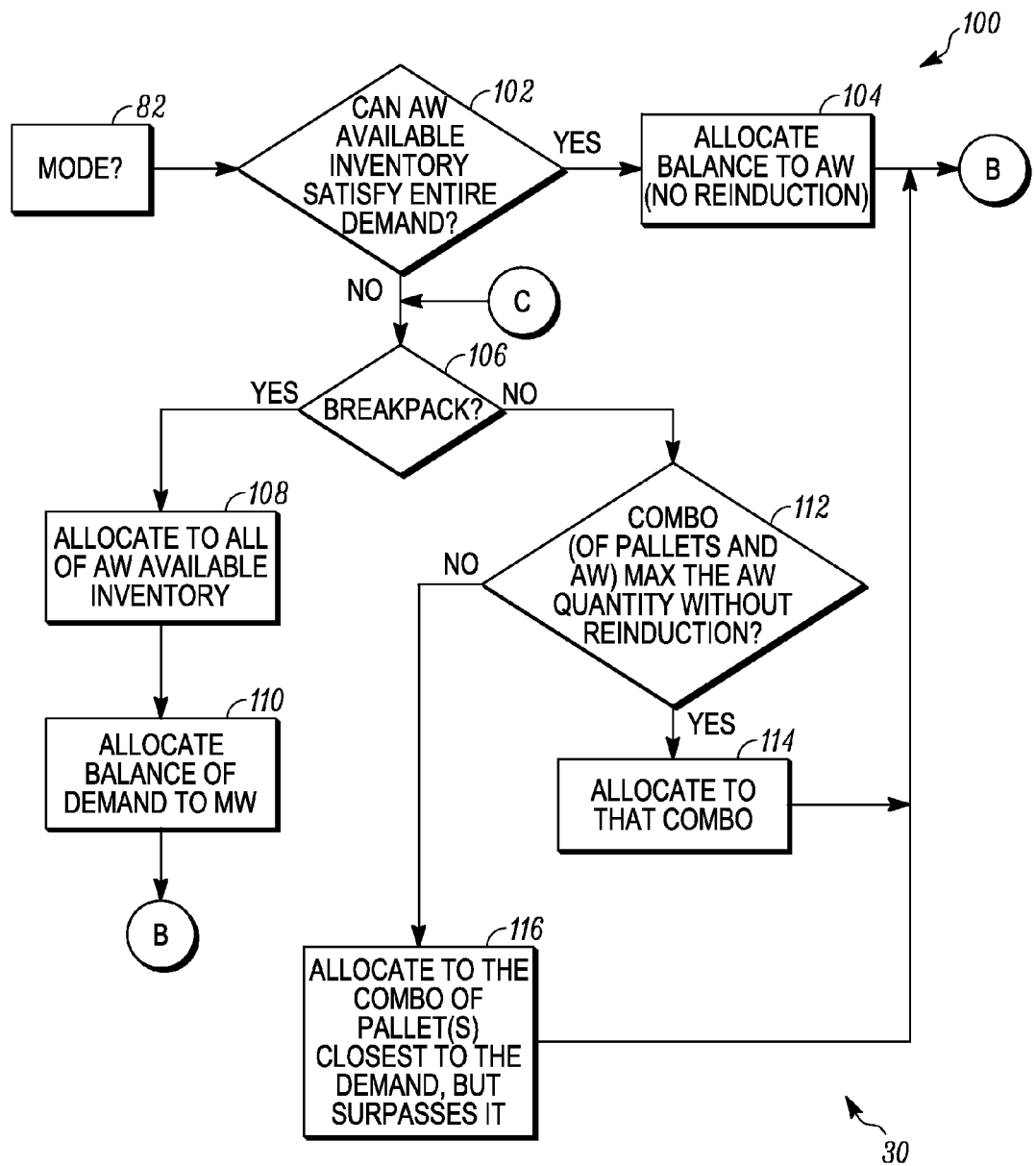

With reference to FIGS. 2C-2E, if the AW 12 is not over capacity, the control scheme 30 proceeds to a user selectable Mode A 80 or a Mode B 100. Mode A is configured such that allocation of orders 32 to the MW 14 is maximized compared to allocation of orders 32 to the AW 12. Mode B is configured such that allocation of orders 32 to the AW 12 is maximized compared to allocation of orders 32 to the MW 14. The use of the Mode A 80 and the Mode B 100 can be beneficial during certain peak periods of time, for example during holiday periods such as Christmas, when it may be more desirable and/or beneficial to maximize use of the AW 12 or the MW 14 compared to the other.

With reference to FIG. 2D, the control scheme 30 includes a decision point 82 which determines whether the Mode A 80 or the Mode B 100 is selected. As a default rule, Mode B is the preferred mode and the control scheme 30 will default to Mode B 100 since retrieving product from the AW 12 is typically more efficient and desirable than using the MW 14. So if the decision point 82 determines that Mode B 100 is selected, the control scheme 30 will proceed to Mode B discussed below with respect to FIG. 2E.

On the other hand, if the Mode A 80 is selected, the control scheme 30 will proceed to decision point 84. At decision point 84, the control scheme 30 decides whether or not, in order to satisfy the order 32, a pallet of product needs to be broken apart to produce a smaller number of cartons on the pallet (referred to as breakpack) to satisfy the ordered quantity of product.

If the decision at decision point 84 is yes, the control scheme 30 proceeds to point E. If the decision at decision point 84 is no, the control scheme 30 proceeds to decision point 86 where it is determined whether or not the remaining demand from the order 32 is greater than the available inventory in the MW 14. If yes, the control scheme 30 proceeds to point E.

If the decision at decision point 86 is no, the scheme 30 proceeds to decision point 88 where it is determined whether or not there is a pallet or combination of pallets in the MW 14 having a quantity of ordered product that does not exceed the demanded quantity, but allows minimum use of the AW 12 to complete the demanded quantity. One purpose of the decision point 88 is to avoid reinduction of product into the AW 12 from the MW 14 by avoiding breaking apart a pallet of product into a smaller number of cartons.

An example of the operation of the decision point 88 is discussed in Example 1 below.

EXAMPLE 1

Assume that there is an order for 101 cartons of a product such as toothbrushes. Also assume that each pallet in the MW 14 has 10 cartons of toothbrushes to a pallet, and that the AW 12 has at least one carton in inventory.

To satisfy the decision point 88 (i.e. the decision at the decision point 88 is yes), the order 32 can be fulfilled by retrieving 10 pallets (100 cartons) from the MW 14, and one carton can be retrieved from the AW 12.

In contrast, the decision at the decision point 88 can be no if, in this example, the AW 12 does not have enough product in inventory to satisfy any remainder from the demand not covered by the palleted product from the MW 14. For example, using the same assumptions as above except that the AW 12 does not have any cartons in inventory, the decision at decision point 88 would be no since there is not a scenario where there is a combination of pallets not exceeding demand together with a minimum use of the AW 12 to complete the demand. In this case, a pallet in the MW 14 will need to be broken apart into a smaller number of cartons, and any leftover cartons from the pallet reinducted into the AW 12.

Resuming with the Mode A 80, if the decision at the decision point 88 is yes, the control scheme 30 proceeds to block 90 where the order 32 is allocated to that combination of pallets from the MW 14 and the minimum AW 12. If the decision at the decision point 88 is no, the control scheme 30 proceeds to block 92 where the control scheme 30 allocates a combination of pallets from the MW 14 that is closest to the demand, but surpasses the demand. One of the pallets would then need to be broken apart to remove cartons to satisfy the order 32, with the removed cartons then being reinducted into the AW 12. After blocks 90 and 92, the control scheme 30 proceeds to point B.

If the decision at the decision point 84 is yes, or the decision at the decision point 86 is yes, the control scheme 30 proceeds with point E and block 94 where the order 32 is allocated to all of the available inventory in the MW 14, and then to block 96 where the balance of the order 32, if any, is allocated to be retrieved from the AW 12. After block 96, the control scheme 30 proceeds to point B.

With reference to FIG. 2E and maximizing use of the AW 12, if the Mode B 100 is selected, or no Mode is selected and the control scheme 30 defaults to the Mode B 100, the control scheme 30 proceeds to a decision point 102 where it is determined whether or not the available inventory in the AW 12 can satisfy the entire order 32. If yes, the control scheme proceeds to block 104 where the remainder of the order 32 is allocated to the AW 12 with no reinduction of product into the AW 12 being necessary. After block 104, the control scheme proceeds to point B.

On the other hand, if the decision at the decision point 102 is no, or if the decision at the decision point 74 in FIG. 2C is no, the control scheme 30 proceeds to decision point 106 which determines whether or not to breakpack as discussed above is required. If yes, the control scheme 30 proceeds to block 108 which allocates the order 32 to the available inventory in the AW 12, followed by block 110 where the balance of the order 32 is allocated to the MW 14. After the block 110, the control scheme 30 proceeds to point B.

If the decision at the decision point 106 is no, the control scheme 30 proceeds to decision point 112 where it is determined whether there is a combination of pallets from the MW 14 and the product from the AW 12 that maximizes the quantity of ordered product retrieved from the AW 12 without reinduction of product back into the AW 12 by breaking apart a pallet of product in the MW 14.

An example of the operation of the decision point 112 is discussed in Example 2 below.

EXAMPLE 2

Assume that there is an order for 109 cartons of a product such as toothbrushes. Also assume that each pallet in the MW 14 has 10 cartons of toothbrushes to a pallet, and that the AW 12 has 80 cartons in inventory.

To satisfy the decision point 112 (i.e. the decision at the decision point 112 is yes), the order 32 can be fulfilled by retrieving 3 pallets (30 cartons) from the MW 14, and 79 cartons from the AW 12.

In contrast, the decision at the decision point 112 can be no if, in this example, instead of the order 32 being for 109 cartons, the order 32 is for 115 cartons. The AW 12 has only 80 cartons in inventory, and 3 full pallets (30 cartons) can be obtained from the MW 14, for a total of 110 cartons. Since there are no further cartons available in the AW 12, in order to allocate the remaining 5 cartons, those 5 cartons would need to come from the MW 14 by breaking apart a pallet of product and reinducting the leftover cartons from the pallet into the AW 12.

Resuming with the Mode B 100, if the decision at the decision point 112 is yes, the scheme proceeds to block 114 where the order 32 is allocated to that combination. If the decision at the decision point 112 is no, the scheme proceeds to block 116 where the order 32 is allocated to a combination of pallets from the MW 14 that is closest to the order 32 but surpasses the order 32. So the allocation in block 116 would result in a full pallet from the MW 14 being broken apart, with removed cartons being reinducted into the AW 12. After blocks 114, 116, the scheme proceeds to point B.

The following are some additional examples of order allocation scenarios resulting from Mode A and Mode B.

EXAMPLE SCENARIOS

Inventory scenario A

| MW Inventory | 100 pallets (10 cartons per pallet) |
|---|---|
| AW Inventory | 100 cartons |

Scenarios (No Reinduction)

|  | Mode A | Mode B |
|---|---|---|
| Order request = 101 | | |
| MW Allocation | 100 | 10 |
| AW Allocation | 1 | 91 |
| Reinduction | 0 | 0 |
| Order request = 189 | | |
| MW Allocation | 180 | 90 |
| AW Allocation | 9 | 99 |
| Reinduction | 0 | 0 |
| Order request = 99 | | |
| MW Allocation | 90 | 0 |
| AW Allocation | 9 | 99 |
| Reinduction | 0 | 0 |
| Order request = 9 | | |
| MW Allocation | 0 | 0 |
| AW Allocation | 9 | 9 |
| Reinduction | 0 | 0 |

Inventory Scenario B

| MW Inventory | 100 pallets (10 cartons per pallet) |
|---|---|
| AW Inventory | 3 cartons |

Scenarios (with Reinduction)

|  | Mode A | Mode B |
|---|---|---|
| Order request = 101 | | |
| MW Allocation | 100 | 100 |
| AW Allocation | 1 | 1 |
| Reinduction | 0 | 0 |
| Order request = 189 | | |
| MW Allocation | 190 | 190 |
| AW Allocation | 0 | 0 |
| Reinduction | 1 | 1 |
| Order request = 99 | | |
| MW Allocation | 100 | 100 |
| AW Allocation | 0 | 0 |
| Reinduction | 1 | 1 |
| Order request = 9 | | |
| MW Allocation | 10 | 10 |
| AW Allocation | 0 | 0 |
| Reinduction | 1 | 1 |

Figure 2F:
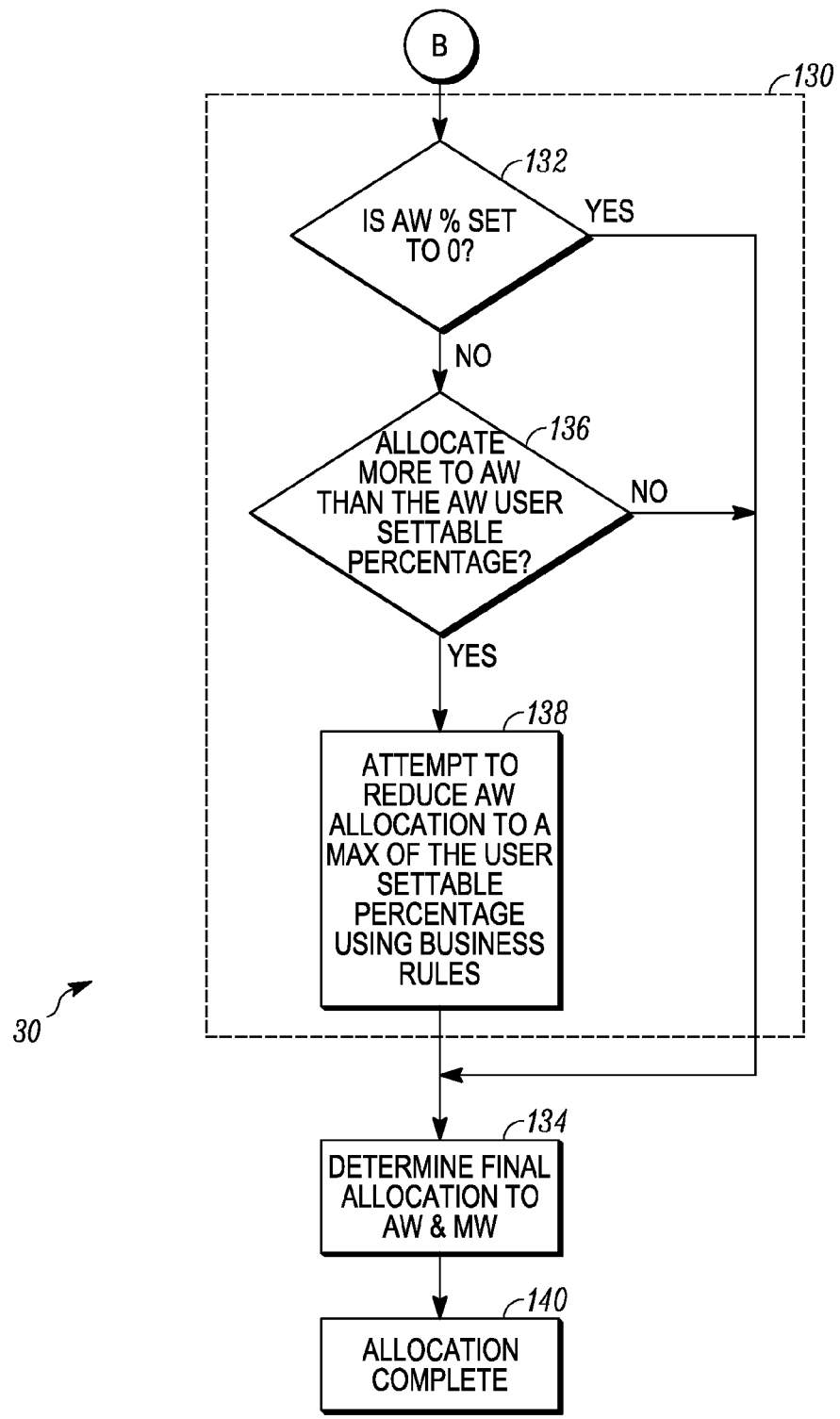

With reference to FIG. 2F, the last stage of the example control scheme 30 is depicted. Point B proceeds to decision point 132 which is part of a throttle routine 130. The throttle routine 130 is configured to permit the user to select how much of an order 32 can be allocated to the AW 12. In the routine 130, the decision point 132 determines whether the user settable percentage from the decision point 50 in FIG. 2B is set to zero. If yes, the throttle routine 130 ends and proceeds to block 134 where the final allocation of the order 32 to be retrieved from the AW 12 and from the MW 14 is determined.

If the decision at the decision point 132 is no, the routine 130 proceeds to decision point 136 where it is determined whether more of the order 32 has been allocated to the AW 12 than the user settable percentage from the decision point 50. If no, the routine 130 ends and proceeds to the block 134.

If the decision at the decision point 136 is yes, the routine 130 proceeds to block 138 where an attempt is made to reduce the AW allocation to a maximum of the user settable percentage from the decision point 50 using one or more business rules. Examples of business rules can include, but are not limited to, looking for products that have long lead times (i.e. products in the order that are not time sensitive with respect to fulfillment) or for products with no or long term product expiration dates. Products with long lead times and/or no or long term expiration dates which have been allocated for retrieval from the AW 12 may be reallocated for retrieval from the MW 14 to help reduce the AW allocation. However, other business rules for determining whether any of the order 32 can be reallocated from the AW 12 to the MW 14 can be used.

For example, when "AW %" is not equal to zero, and the percentage of cartons in the order 32 allocated to be retrieved from the AW 12 (in relation to the entire number of cartons in the entire order 32) is at, or in excess of, the "AW %" threshold from decision point 50, then the control scheme 30 is configured to attempt a reduction in the percentage of the order 32 that is allocated to the AW 12 by attempting to reallocate some of the order 32 to the MW 14. In the business rules examples mentioned above, the control scheme 30 looks for ordered products within the order 32 that have been allocated to the AW 12, but which have long lead times and/or no or long term expiration dates. Those ordered products may be reallocated for retrieval from the AW 12 to the MW 14 to reduce the AW allocation to at or below the AW % threshold. If no such ordered products exist and the AW allocation cannot be reduced, the control scheme 30 proceeds with the AW allocation even though it exceeds the AW % threshold.

After block 138, the control scheme 30 proceeds to the block 134 for the final allocation of the order 32 to determine how much of the ordered product will be retrieved from the AW 12 and how much of the ordered product will be retrieved from the MW 14. After the block 134, the control scheme 30 then ends at block 140.

Once the final allocations of the order are determined that dictate how much of the ordered product will be retrieved from the AW 12 and how much of the ordered product will be retrieved from the MW 14, the order is then fulfilled by retrieving the product(s) from the AW 12 and the MW 14, and then shipping the product(s) to the store 15.

FIG. 3 is a schematic diagram of an example architecture for a computer device 500. The computer device 500 and any of the individual components thereof can be used for any of the operations described in accordance with any of the computer-implemented methods described herein.

The computer device 500 generally includes a processor 510, memory 520, a network input/output (I/O) 525, storage 530, and an interconnect 550. The computer device 500 can optionally include a user I/O 515, according to some embodiments. The computer device 500 can be in communication with one or more additional computer devices 500 through a network 540.

The computer device 500 is generally representative of hardware aspects of a variety of user devices 501 and a server device 535. The illustrated user devices 501 are examples and are not intended to be limiting. Examples of the user devices 501 include, but are not limited to, a desktop computer 502, a cellular/mobile phone 503, a tablet device 504, and a laptop computer 505. It is to be appreciated that the user devices 501 can include other devices such as, but not limited to, a personal digital assistant (PDA), a video game console, a television, or the like. In some embodiments, the user devices 501 can alternatively be referred to as client devices 501. In such embodiments, the client devices 501 can be in communication with the server device 535 through the network 540. One or more of the client devices 501 can be in communication with another of the client devices 501 through the network 540 in some embodiments.

The processor 510 can retrieve and execute programming instructions stored in the memory 520 and/or the storage 530. The processor 510 can also store and retrieve application data residing in the memory 520. The interconnect 550 is used to transmit programming instructions and/or application data between the processor 510, the user I/O 515, the memory 520, the storage 530, and the network I/O 540. The interconnect 550 can, for example, be one or more busses or the like. The processor 510 can be a single processor, multiple processors, or a single processor having multiple processing cores. In some embodiments, the processor 510 can be a single-threaded processor. In some embodiments, the processor 510 can be a multi-threaded processor.

The user I/O 515 can include a display 516 and/or an input 517, according to some embodiments. It is to be appreciated that the user I/O 515 can be one or more devices connected in communication with the computer device 500 that are physically separate from the computer device 500. For example, the display 516 and input 517 for the desktop computer 502 can be connected in communication but be physically separate from the computer device 500. In some embodiments, the display 516 and input 517 can be physically included with the computer device 500 for the desktop computer 502. In some embodiments, the user I/O 515 can physically be part of the user device 501. For example, the cellular/mobile phone 503, the tablet device 504, and the laptop 505 include the display 516 and input 517 that are part of the computer device 500. The server device 535 generally may not include the user I/O 515. In some embodiments, the server device 535 can be connected to the display 516 and input 517.

The display 516 can include any of a variety of display devices suitable for displaying information to the user. Examples of devices suitable for the display 516 include, but are not limited to, a cathode ray tube (CRT) monitor, a liquid crystal display (LCD) monitor, a light emitting diode (LED) monitor, or the like.

The input 517 can include any of a variety of input devices or means suitable for receiving an input from the user. Examples of devices suitable for the input 517 include, but are not limited to, a keyboard, a mouse, a trackball, a button, a voice command, a proximity sensor, an ocular sensing device for determining an input based on eye movements (e.g., scrolling based on an eye movement), or the like. It is to be appreciated that combinations of the foregoing inputs 517 can be included for the user devices 501. In some embodiments the input 517 can be integrated with the display 516 such that both input and output are performed by the display 516.

The memory 520 is generally included to be representative of a random access memory such as, but not limited to, Static Random Access Memory (SRAM), Dynamic Random Access Memory (DRAM), or Flash. In some embodiments, the memory 520 can be a volatile memory. In some embodiments, the memory 520 can be a non-volatile memory. In some embodiments, at least a portion of the memory can be virtual memory.

The storage 530 is generally included to be representative of a non-volatile memory such as, but not limited to, a hard disk drive, a solid state device, removable memory cards, optical storage, flash memory devices, network attached storage (NAS), or connections to storage area network (SAN) devices, or other similar devices that may store non-volatile data. In some embodiments, the storage 530 is a computer readable medium. In some embodiments, the storage 530 can include storage that is external to the computer device 500, such as in a cloud.

The network I/O 525 is configured to transmit data via a network 540. The network 540 may alternatively be referred to as the communications network 540. Examples of the network 540 include, but are not limited to, a local area network (LAN), a wide area network (WAN), the Internet, or the like. In some embodiments, the network I/O 525 can transmit data via the network 540 through a wireless connection using WiFi, Bluetooth, or other similar wireless communication protocols. In some embodiments, the computer device 500 can transmit data via the network 540 through a cellular, 3G, 4G, or other wireless protocol. In some embodiments, the network I/O 525 can transmit data via a wire line, an optical fiber cable, or the like. It is to be appreciated that the network I/O 525 can communicate through the network 540 through suitable combinations of the preceding wired and wireless communication methods.

The server device 535 is generally representative of a computer device 500 that can, for example, respond to requests received via the network 540 to provide, for example, data for rendering a website on the user devices 501. The server 535 can be representative of a data server, an application server, an Internet server, or the like.

Aspects described herein can be embodied as a system, method, or a computer readable medium. In some embodiments, the aspects described can be implemented in hardware, software (including firmware or the like), or combinations thereof. Some aspects can be implemented in a non-transitory, tangible computer readable medium, including computer readable instructions for execution by a processor. Any combination of one or more computer readable medium(s) can be used.

The computer readable medium can include a computer readable signal medium and/or a computer readable storage medium. A computer readable storage medium can include any tangible medium capable of storing a computer program for use by a programmable processor to perform functions described herein by operating on input data and generating an output. A computer program is a set of instructions that can be used, directly or indirectly, in a computer system to perform a certain function or determine a certain result. Examples of computer readable storage media include, but are not limited to, a floppy disk; a hard disk; a random access memory (RAM); a read-only memory (ROM); a semiconductor memory device such as, but not limited to, an erasable programmable read-only memory (EPROM), an electrically erasable programmable read-only memory (EEPROM), Flash memory, or the like; a portable compact disk read-only memory (CD-ROM); an optical storage device; a magnetic storage device; other similar device; or suitable combinations of the foregoing. A computer readable signal medium can include a propagated data signal having computer readable instructions. Examples of propagated signals include, but are not limited to, an optical propagated signal, an electro-magnetic propagated signal, or the like. A computer readable signal medium can include any computer readable medium that is not a computer readable storage medium that can propagate a computer program for use by a programmable processor to perform functions described herein by operating on input data and generating an output.

Some embodiments can be provided to an end-user through a cloud-computing infrastructure. Cloud computing generally includes the provision of scalable computing resources as a service over a network (e.g., the Internet or the like).

The described embodiment(s) may be embodied in other forms without departing from the spirit or novel characteristics thereof. The embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A system, comprising:
an automated warehouse that is configured to store product;
a manual warehouse that is configured to store product;
a control system in communication with the automated warehouse and the manual warehouse, the control system is configured with a product order allocation control scheme that is configured to receive a product order request demanding a quantity of ordered product, and in response to a received product order request, allocate the product order request between one or more of the automated warehouse and the manual warehouse so that the demanded quantity of the ordered product is retrieved from one or more of the automated warehouse and the manual warehouse; and
the control scheme is configured to monitor how full the automated warehouse is with the ordered product from the received product order request, and if the automated warehouse contains more than a predetermined threshold of the ordered product, the control scheme will allocate the received product order request so that the demanded quantity of the ordered product is retrieved from the automated warehouse.

2. The system of claim 1, wherein the control scheme is also configured to determine whether or not the ordered product is eligible for the automated warehouse, and if the ordered product is not eligible for the automated warehouse the control scheme will allocate the received product order request so that the demanded quantity of the ordered product will be retrieved from any available inventory of the ordered product in the automated warehouse with the remainder of the ordered product in the received product order request being retrieved from the manual warehouse.

3. The system of claim 1, wherein the control scheme can be user configured to cause a user selected percentage of the quantity of the ordered product in the received product order request to be retrieved from the automated warehouse.

4. The system of claim 1, wherein the control scheme includes a full pallet availability routine that is configured to cause retrieval of a full pallet of the ordered product in the received product order request from the manual warehouse.

5. The system of claim 1, wherein the control scheme is configured to include a user selectable mode that maximizes allocation of the received product order request to the manual warehouse, and a user selectable mode that maximizes allocation of the received product order request to the automated warehouse.

6. The system of claim 1, wherein the control scheme is configured to include a user selectable mode that permits a user to set a percentage of the ordered product in the received product order request to be retrieved from the automated warehouse to zero.

7. The system of claim 1, wherein the control system is located at both the automated warehouse and the manual warehouse.

8. The system of claim 1, further comprising a retail store that can receive the ordered product from the received product order request that is retrieved and shipped from the automated warehouse and/or the manual warehouse.

9. The system of claim 8, wherein the received product order request originates from the retail store.

10. A method of allocating a product order request that demands a quantity of ordered product to fulfill the product order request using an automated warehouse that is configured to store product and a manual warehouse that is configured to store product, comprising:
providing a control system that is in communication with the automated warehouse and the manual warehouse;

configuring the control system with a control scheme, the control scheme is configured to determine how much of the ordered product in the product order request will be fulfilled from the automated warehouse and how much of the ordered product in the product order request will be fulfilled from the manual warehouse; and the control scheme monitoring how full the automated warehouse is with the ordered product, and if the automated warehouse contains more than a predetermined amount of the ordered product, the control scheme causing all of the ordered product in the product order request to be fulfilled from the automated warehouse.

11. The method of claim 10, wherein the control scheme determines whether or not the ordered product is eligible for the automated warehouse, and if the ordered product is not eligible for the automated warehouse the control scheme causing the ordered product to be fulfilled from any available inventory of the ordered product in the automated warehouse with the remainder of the ordered product being fulfilled from the manual warehouse.

12. The method of claim 10, further comprising the control scheme permitting user selection of a percentage of the ordered product to be fulfilled from the automated warehouse.

13. The method of claim 10, further comprising the control scheme executing a full pallet availability routine that is configured to result in the ordered product being fulfilled using at least one full pallet from the manual warehouse.

14. The method of claim 10, further comprising configuring the control scheme to include a user selectable mode that maximizes fulfillment of the ordered product in the product order request from the manual warehouse, and a user selectable mode that maximizes fulfillment of the ordered product in the product order request from the automated warehouse.

15. The method of claim 10, further comprising configuring the control scheme to include a user selectable mode that permits a user to set a percentage of the ordered product in the product order request to be fulfilled from the automated warehouse to zero.

16. The method of claim 10, further comprising locating the control system at both the automated warehouse and the manual warehouse.

17. The method of claim 10, further comprising shipping the ordered product from the automated warehouse and/or the manual warehouse to a retail store.

18. The method of claim 17, wherein the product order request originates from the retail store.

19. A computer program product that includes one or more non-transitory computer-readable tangible storage devices, and program instructions stored on at least one of the non-transitory computer-readable tangible storage devices which, when executed, perform the following to determine allocation of a product order request to fulfill the product order request using an automated warehouse that is configured to store product and/or using a manual warehouse that is configured to store product:

receive the product order request demanding a quantity of an ordered product and in response thereto, at least one of the following:
a) allocating the product order request for fulfillment by the automated warehouse if the automated warehouse contains more than a predetermined percentage of the ordered product in the product order request;

b) determining whether or not the ordered product is eligible for the automated warehouse, and if the ordered product is not eligible for the automated warehouse causing the order to be fulfilled from any available inventory of the ordered product in the automated warehouse with the remainder of the ordered product being fulfilled from the manual warehouse.

20. The computer program product of claim 19, wherein the program instructions stored on the at least one of the non-transitory computer-readable tangible storage devices, when executed, further performs one or more of the following:

c) causing a user selected percentage of the ordered product to be fulfilled from the automated warehouse;
d) running a full pallet availability routine that results in retrieval of a full pallet of the ordered product from the manual warehouse;
e) maximizing allocation of the product order request to the manual warehouse, or maximizing allocation of the product order request to the automated warehouse; and
f) permitting a user to set a percentage of the ordered product to be fulfilled from the automated warehouse to zero.

21. A system, comprising:
an automated warehouse that is configured to store product;
a manual warehouse that is configured to store product;
a control system in communication with the automated warehouse and the manual warehouse, the control system is configured with a product order allocation control scheme that is configured to receive a product order request demanding a quantity of ordered product, and in response to a received product order request, allocate the product order request between one or more of the automated warehouse and the manual warehouse so that the demanded quantity of the ordered product is retrieved from one or more of the automated warehouse and the manual warehouse; and
the control scheme is configured to monitor how full the automated warehouse is with the ordered product from the received product order request, and if the automated warehouse contains more than a predetermined threshold of the ordered product, the control scheme will allocate the received product order request so that the demanded quantity of the ordered product is retrieved from the automated warehouse,
wherein the control scheme is configured to include a user selectable mode that permits a user to set a percentage of the ordered product in the received product order request to be retrieved from the automated warehouse to zero.

22. A method of allocating a product order request that demands a quantity of ordered product to fulfill the product order request using an automated warehouse that is configured to store product and a manual warehouse that is configured to store product, comprising:

providing a control system that is in communication with the automated warehouse and the manual warehouse;
configuring the control system with a control scheme, the control scheme is configured to determine how much of the ordered product in the product order request will be fulfilled from the automated warehouse and how much of the ordered product in the product order request will be fulfilled from the manual warehouse;
the control scheme monitoring how full the automated warehouse is with the ordered product, and if the automated warehouse contains more than a predetermined amount of the ordered product, the control scheme causing all of the ordered product in the product order request to be fulfilled from the automated warehouse; and configuring the control scheme to include a user selectable mode that permits a user to set a percentage of the ordered product in the product order request to be fulfilled from the automated warehouse to zero.

\* \* \* \* \*